United States Patent
Zimmer et al.

(10) Patent No.: US 6,820,303 B2
(45) Date of Patent: Nov. 23, 2004

(54) WIPER ARM WITH A PIVOTING CONNECTED WIPER BLADE

(75) Inventors: Joachim Zimmer, Sasbach (DE); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,940

(22) PCT Filed: Nov. 28, 2001

(86) PCT No.: PCT/DE01/04474

§ 371 (c)(1),
(2), (4) Date: Sep. 17, 2002

(87) PCT Pub. No.: WO02/060730

PCT Pub. Date: Aug. 8, 2002

(65) Prior Publication Data

US 2003/0037398 A1 Feb. 27, 2003

(30) Foreign Application Priority Data

Jan. 30, 2001 (DE) .......................... 101 03 889

(51) Int. Cl.[7] .................................. B60S 1/32
(52) U.S. Cl. .................. 15/250.43; 15/250.44; 15/250.351; 15/250.361; 15/250.31
(58) Field of Search ............... 15/250.43, 250.44, 15/250.351, 250.361, 250.32, 250.352, 250.33, 250.31, 250.23

(56) References Cited

U.S. PATENT DOCUMENTS 3,123,849 A * 3/1964 O'Shei .................. 15/250.351
3,832,751 A * 9/1974 Ursel et al. .............. 15/250.23
5,729,861 A * 3/1998 Journee .................. 15/250.351
5,842,251 A * 12/1998 LeFran.cedilla.ois et al. ................................ 15/250.04
6,415,473 B1   7/2002 Rapp .................. 15/250.351

FOREIGN PATENT DOCUMENTS

| DE | 2352536 | * | 4/1975 | |
| DE | 34 31 936 A | | 3/1985 | |
| DE | 37 44 237 A | | 7/1989 | |
| DE | 38 29 343 A | | 3/1990 | |
| DE | 44 06 131 A | | 9/1995 | |
| DE | 44 06 131 A1 | | 9/1995 | |
| DE | 195 47 540 | | 6/1997 | |
| DE | 19605428 | * | 8/1997 | |
| DE | 196 47 347 A | | 5/1998 | |
| DE | 197 31 683 A | | 1/1999 | |
| DE | 197 38 232 A1 | | 3/1999 | |
| GB | 2240264 | * | 7/1991 | |
| IT | 435099 | * | 5/1948 | .............. 15/250.23 |
| JP | 6-247262 | * | 6/1994 | |

* cited by examiner

Primary Examiner—Gary K. Graham
(74) Attorney, Agent, or Firm—Michael J. Striker

(57) ABSTRACT

The invention is based on a wiper arm (10), with a pivotably connected wiper blade (16), which includes at least one bracket (18,20,22) and a wiper strip (26) and which is guided laterally in relation to the wiper arm (10) by a device (32,44,58). A first part (34,48,62) of the device (32,44,58) associated with the wiper arm (10) is connected to a second part (36,46) associated with the wiper blade (16) by means of a link (38,50,60), which flexes approximately perpendicular to the windshield (30). The invention proposes that the second part (36,46) be permanently connected to the wiper blade (16).

5 Claims, 4 Drawing Sheets

WIPER ARM WITH A PIVOTING CONNECTED WIPER BLADE

BACKGROUND OF THE INVENTION

The invention relates to a wiper arm with a pivotably connected wiper blade as generically defined by the preamble to claim 1.

Known windshield wipers have a wiper arm, which is comprised of a mounting part and a joint part pivotably connected to it, which has a wiper rod. The wiper arm is pivotably connected to a wiper blade, which is comprised of a supporting bracket system with a center bracket, and possibly secondary brackets, e.g. an intermediate bracket and/or claw brackets that hold a wiper strip. The brackets are also pivotably connected to the secondary brackets, allowing the wiper strip to adapt to the windshield curvature during the pivoting motion. The joints between the brackets are typically plastic parts, which simultaneously cover the end face of the profile of the primary bracket.

In addition, DE A1 197 38 232 has disclosed a wiper strip support element made of an elastic, high-strength plastic, which when unstressed, has a curvature designed to produce a uniform contact pressure when the wiper strip rests completely against the windshield during operation of the wiper blade. Plastic end caps are mounted on the end faces of the profile. Similar wiper blades with a support element made of spring steel have also been disclosed.

Large velocity differences between the inner region oriented toward the drive unit and the outer region of the wiper blade as well as stick-slip effects cause the wiper blade to vibrate. Particularly in the inner circle of the wiper blade where friction velocity is especially low, this leads to undesirable lateral movements, which starting from a certain magnitude, can cause the wiper blade to strike against the wiper arm and create a clattering noise. This is particularly critical when the windshield is dirty, iced over, not wet enough, or covered by snow. Since the wiper blade can thus temporarily lose contact with the windshield, the wiping pattern is also unsatisfactory. The wiper blade tends to rattle more the longer it is and the more bracket parts it contains. Furthermore, lightweight wiper blades with a low spring rigidity perform less favorably than others.

DE 37 44 237 A1 has also disclosed a windshield wiper, which, between a wiper arm and a claw bracket, has a device designed to guide a wiper blade, which is disposed at the end of the wiper blade oriented toward a drive shaft. The device is attached to the wiper arm and guides the wiper blade by means of at least one guide cheek in the vicinity of a joint between a center bracket and a claw bracket. Accordingly, the cheeks have to be long enough to reliably guide the wiper blade in all positions. Depending on the curvature of the windshield and the kinematics of the windshield wiper, there is the danger that long cheeks will collide with the vehicle windshield in certain positions. Finding a compromise is difficult if the windshield wipers are supposed to fit different vehicle windshields with very different curvatures.

DE 197 31 683 A1 has also disclosed a device for guiding a wiper blade, which is comprised of a first and second part. This device is disposed in the vicinity of the linkage point of the claw bracket and permanently connected to the joint part of the wiper arm, e.g. by means of gluing, welding, soldering, clipping, clamping, etc. The first part of the device has guide cheeks that encompass the joint position of the claw bracket and guide it in relation to the wiper arm. The second part also has guide cheeks between which the first part is guided in telescoping fashion so that its guide cheeks can be kept short and there is no danger of a collision with the windshield, even with sharp vehicle windshield curvatures. The first part is suitably connected to the device in captive fashion, e.g. by means of a flexible element.

The second part can also consist of a flexible tongue, which connects the first part to the device in such a way that the first part is rigidly guided in the movement direction of the windshield wiper, whereas it can flex in relation to the wiper arm, perpendicular to the windshield. Naturally, it is also possible to top for a combination of a flexible tongue and guide checks for the second part, in which the flexible tongue performs the function of the flexible element. It is also possible for the device to be made and assembled of sheet metal parts, but it is preferably an injection molded part made of a suitable plastic. But in any case, additional components are required for guiding the wiper blade, which results in increased manufacturing and assembly costs and additional raw material cost.

SUMMARY OF THE INVENTION

According to the invention, the second part of the device associated with the wiper blade is permanently connected to the wiper blade. The first part of the device associated with the wiper arm can also be permanently connected to the wiper arm; the necessary relative motion between the wiper arm and the wiper blade can be absorbed relatively freely by the flexible link so that the device does not change either the contact force of the wiper blade or its angle in relation to the vehicle windshield.

The first part of the device can also rest against the wiper arm with guide surfaces, which allow the wiper arm to move in the longitudinal direction and perpendicular to the windshield, but guide the wiper blade laterally, crosswise to the wiping motion so that the device does not apply any force to the wiper blade other than the lateral guidance. Since the guide surfaces are disposed on the side of the device oriented away from the vehicle windshield and since the part of the device oriented toward the windshield is mounted to the wiper blade, this prevents any collision with the vehicle windshield. The lateral guidance of the wiper blade limits lateral movements of the wiper blade and prevents the wiper blade from rattling or clattering. The guide surfaces are suitably provided with ribs extending in the stroke direction. This decreases the contact surface area, which reduces friction and prevents the guide mechanism from jamming.

The device is preferably embodied as a plastic component and, according to one embodiment of the invention, the part permanently connected to the wiper blade is formed onto a plastic end piece in the joint region of a bracket or wiper strip. Consequently, a separate part is not required for guiding the wiper blade. In addition, the end piece in the form of a cap or a bearing part is mounted along with the device in a single work step, which renders additional assembly steps unnecessary and keeps manufacturing cost down. This part is connected to a first part of the device by means of a link, which has one or more guide surfaces. The guide surfaces rest laterally against the wiper arm or engage in a guide profile of the wiper arm, e.g. a slot.

In a suitable fashion, the link is embodied as a flexible element, e.g. as a leaf spring, so that vertical motions between the wiper blade and the wiper arm, which are generated by the kinematic sequence during wiper operation, are compensated for. The spring force of the leaf spring is chosen so as to have no effect on the contact force of the wiper blade, in order to obtain an optimal wiper performance and to prevent excess wear and tear on the wiper rubber. With an appropriate design of the leaf spring, the first part, which is associated with the wiper arm, can be permanently connected to the wiper arm. This design can be considered whenever the relative motions between the wiper blade and the wiper arm in the longitudinal direction and/or in the direction perpendicular to the windshield are not very great.

The wiper blade guide device according to the invention solves the problems mentioned in the Prior Art section simply and without the use of additional components, so that no further assembly costs are incurred. Another advantage of this wiper blade guidance lies in the fact that the device is largely covered by the wiper arm, does not take up additional installation space, and allows for a compact design of the windshield wiper in the vicinity of the wiper arm and wiper blade. A compact windshield wiper generates less wind noise and has a better design.

To improve the lateral guidance of the wiper blade, according to one embodiment of the invention, the wiper arm has projections in the vicinity of the guide surfaces, which projections are oriented in the stroke direction of the vertical motion. The projections can have different profiles as needed, permitting various magnitudes of lateral force to be absorbed and different space requirements to be accommodated. Moreover, a form-fitting connection additionally improves the guidance.

The wiper blade guidance according to the invention is also suitable for very flat wiper blades, such as jointless types of wiper blades. In this case, the second part is embodied as an end cap, which embraces the wiper strip and the support element at the end and is permanently connected to them. Depending on the intended use, the leaf spring can be disposed on the top, on the side, or in the extension of the wiper blade, which permits a range of applications to be covered and various spring properties and support moments to be produced.

BRIEF DESCRIPTION OF THE DRAWINGS

Other advantages ensue from the following description of the drawings. The drawings depict exemplary embodiments of the invention. The drawings, specification, and claims contain numerous features in combination. One skilled in the art will naturally also consider the features individually and unite them in other meaningful combinations.

DETAILED DESCRIPTION OF THE PREFERRED EMBODIMENTS

Figure 1:
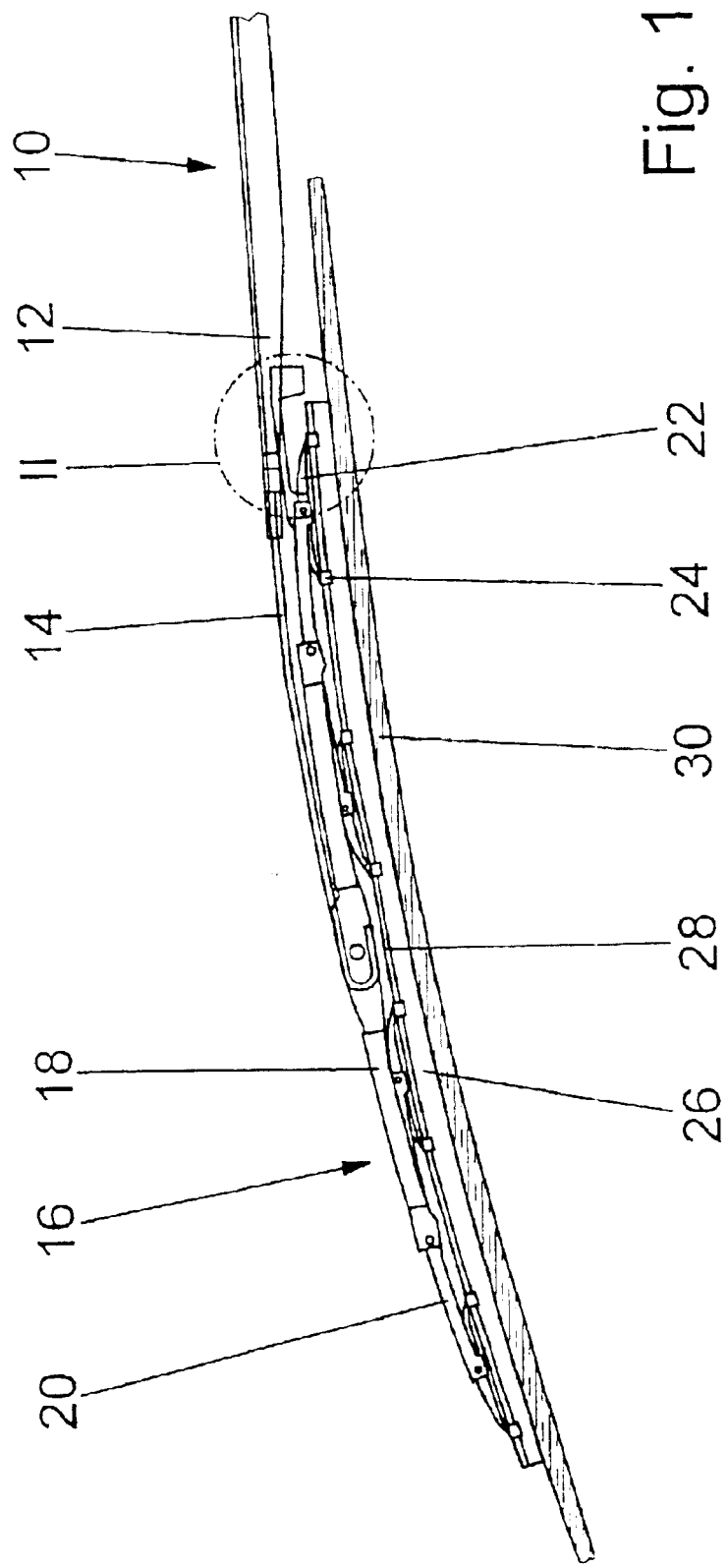
FIG. 1 shows a side view of a windshield wiper with a device for guiding a wiper blade.

FIG. 1 depicts a joint 12 with a wiper rod 14 of a wiper arm 10. The hook-shaped end of the wiper rod 14 holds a wiper blade 16 that is comprised of a support bracket system with a center bracket 18 to which intermediate brackets 20 are pivotably connected as well as claw brackets 22. The claws of 24 of claw bracket 22 hold the top strip 28 of a wiper strip 26. The support bracket system and the pivotable connection between the wiper rod 14 and the wiper blade 16 permit the wiper strip 26 to adapt to the curvature of a vehicle windshield 30.

Figure 2:
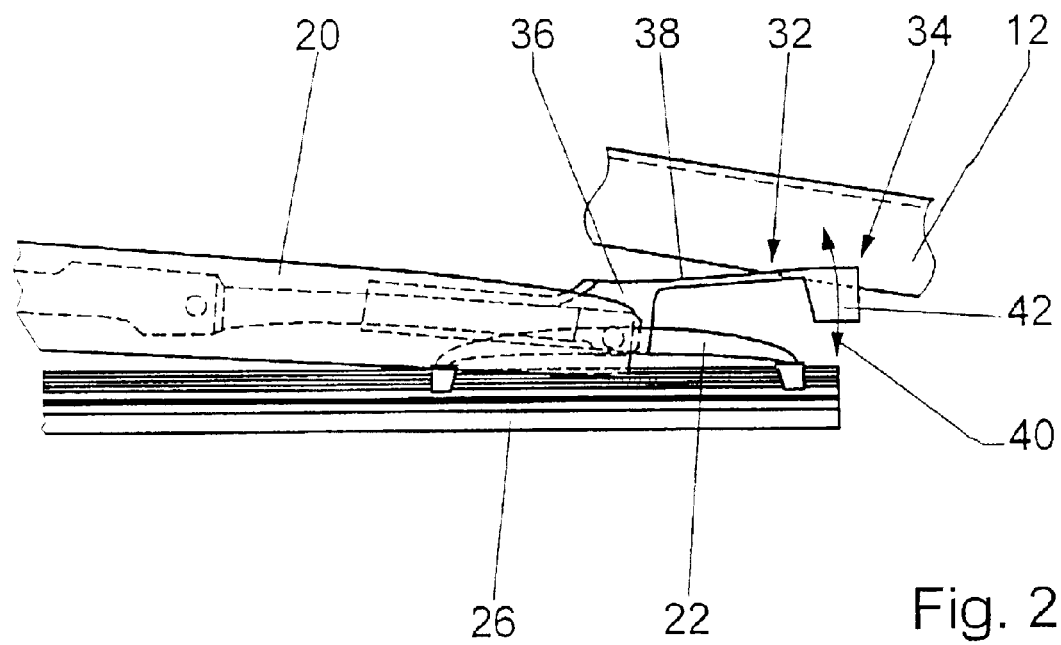
FIG. 2 shows an enlargement of a detail II in FIG. 1.

A device 32 for guiding the wiper blade 16 is disposed at the linkage point of a claw bracket 22 oriented toward the drive unit (FIG. 2). The device is comprised of several parts. A so-called second part 36 is permanently connected to the wiper blade 16 by being formed onto a plastic end piece embodied as a bearing part. A link 38 embodied in the form of a leaf spring connects this second part 36 of the device 32 to a first part 34, which is disposed in the extension of the wiper blade 16 and is oriented toward the joint part 12. The first part 34 has guide surfaces 42, which rest laterally against the joint part 12 and which guide the wiper blade 16 during the wiping motion. Due to the flexible connection 38 between the two parts 34 and 36 of the device 32, the first part 34 is able to follow the motion of the joint part 12 in the stroke direction 40 without losing contact. It compensates for a vertical change between the wiper blade 16 and the joint part 12 and the guide surfaces 42 continuously rest against the joint part 12 without having to be long.

Figure 3:
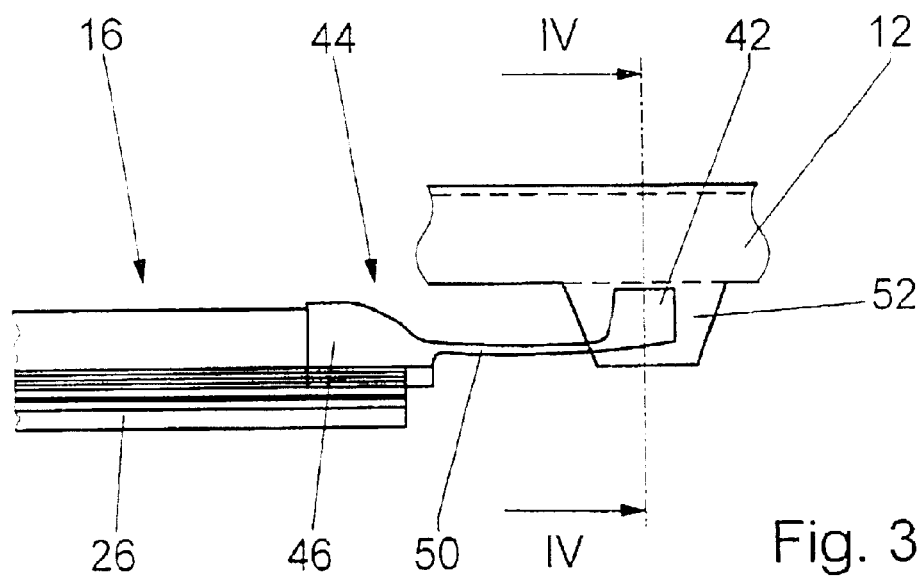
FIG. 3 shows a wiper blade end oriented toward the drive unit, with one variant of a wiper blade guide mechanism.
Figure 4:
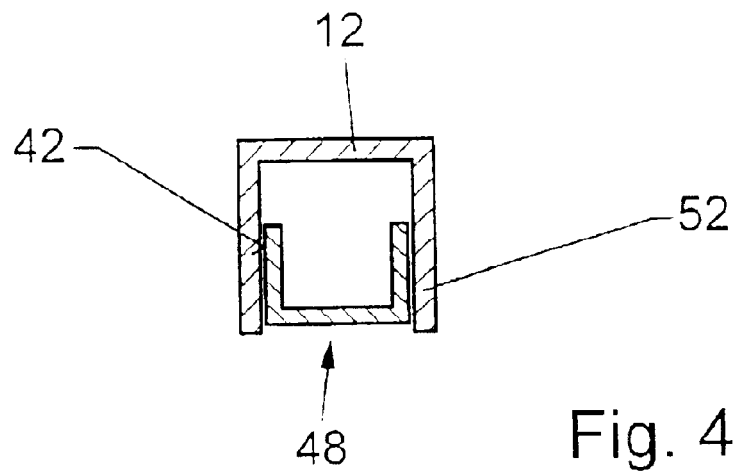
FIG. 4 shows an enlarged cross section corresponding to a line IV—IV in FIG. 3
Figure 5:
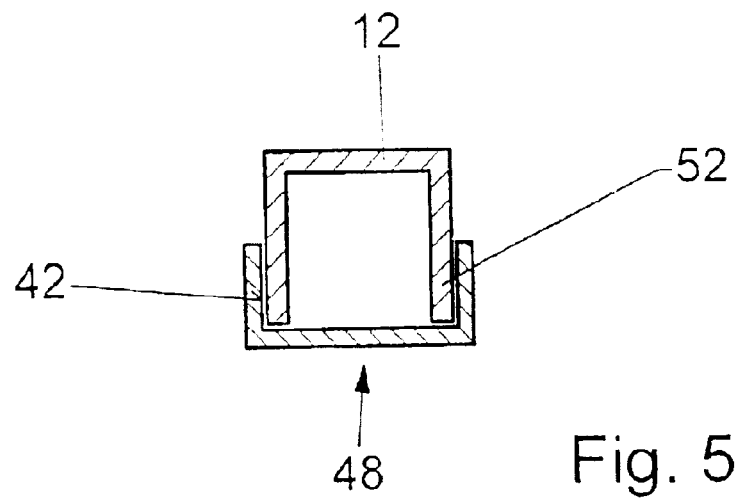
FIGS. 5 to 6 show variants of FIG. 4.
Figure 6:
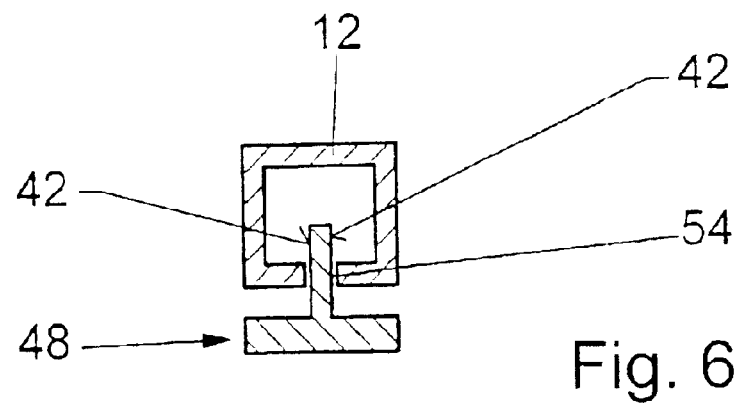

A device 44 for guiding a very flat wiper blade 16 is shown in FIG. 3. In this case, a cap 46 is placed onto to the end of wiper strip 26. In the extension of the wiper strip 26, a leaf spring 50 is formed onto the cap 46 and connects the cap 46 to a first part 48 of wiper blade guide 44. In this embodiment of the invention the joint part 12 has projections 52, which point in the stroke direction 40, in the vicinity of the guide surfaces 42 of the first part 48. The projections 52 overlap the guide surfaces 42 of the first part 48 on the outside (FIG. 4). As a variant, the projections 52 can also overlap the guide surfaces 42 of the first part 48 on the inside (FIG. 5). In the embodiment according to FIG. 6, the first part 48 of device 44 has guide surfaces 42, which engage in a profile 54, e.g. a slot, of the joint part 12.

Figure 7:
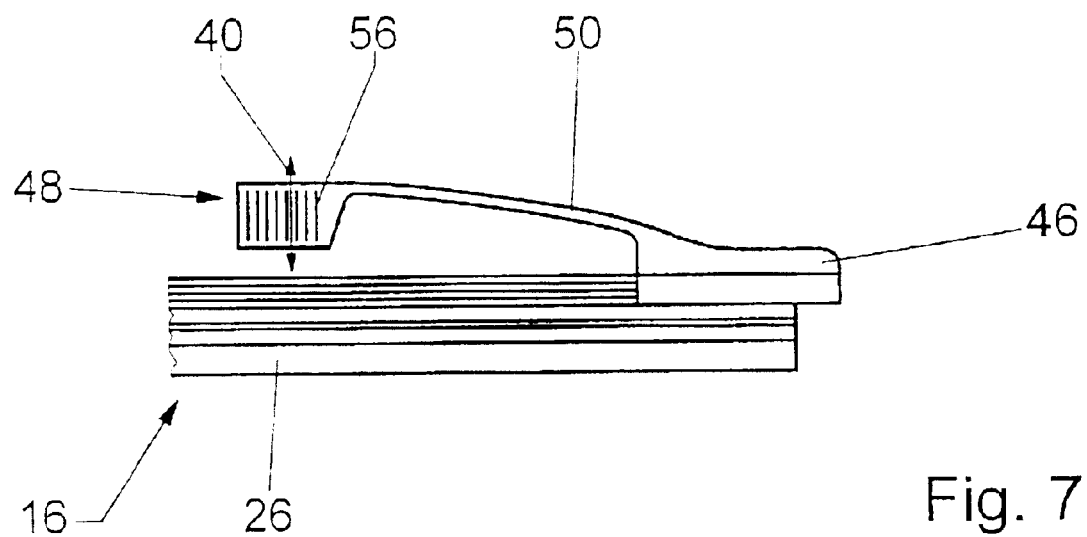
FIGS. 7 to 8 show variants of FIG. 3.
Figure 8:
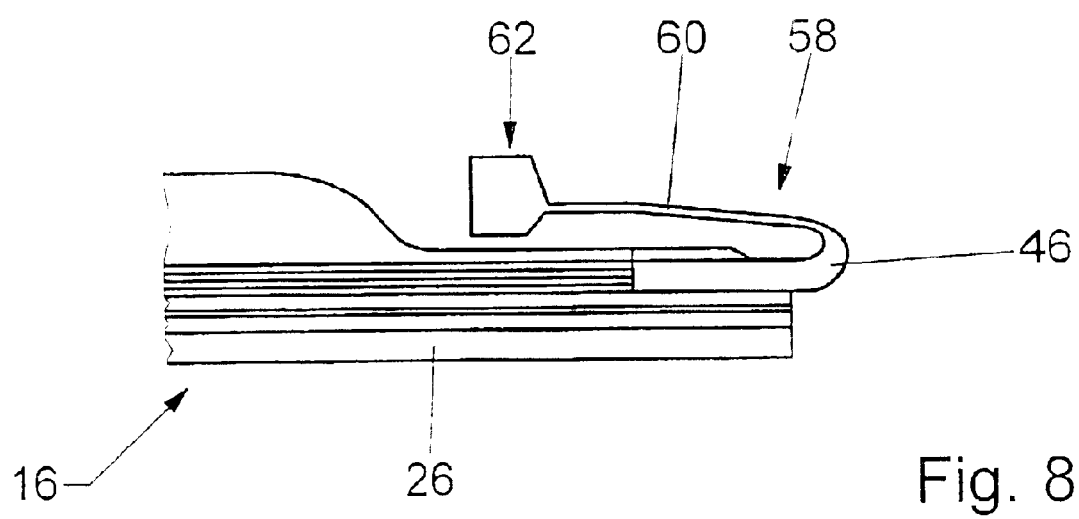
Figure 9:
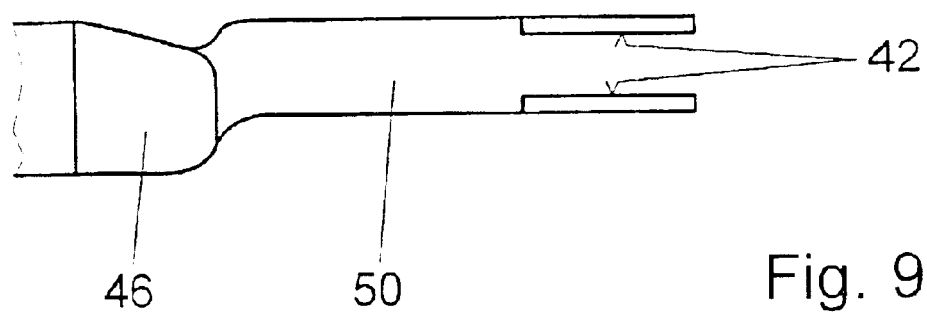
FIG. 9 shows a variant of FIG. 3 in a top view.

If necessary, e.g. when there is a limited amount of space, the leaf spring 50 can also be disposed above wiper blade 16 (FIG. 7). In addition, the guide surfaces 42 of the first part 48 have ribs 56 extending in the stroke direction 40, which reduce the contact surface area. FIG. 8 shows another variant of the invention. In the device 58 as well, the leaf spring 60 is disposed above the wiper blade 16. In order to achieve sufficient clearance for the flexible first part 62 of device 58, the wiper blade 16 is correspondingly recessed in this region. In the embodiment according to FIG. 9, the second part 46 of device 44 is disposed so that it is offset laterally from the first part 48 so that the leaf spring 50 is disposed lateral to the wiper blade 16 and/or the wiper strip 26.

What is claimed is:

1. A wiper arm (10), in combination with a pivotably connected wiper blade (16), said blade includes at least one bracket (18, 20, 22) and a wiper strip (26) and is guided laterally in relation to the wiper arm (10) by a device (32, 44, 58), wherein a first part (34, 48, 62) of the device (32, 44, 58) associated with the wiper arm (10) has guide surfaces, wherein said guide surfaces rest laterally against the wiper arm or engage in a guide profile (54) of the wiper arm, wherein the guide surfaces permit a movement in a longitudinal direction of the wiper arm and perpendicular to a vehicle windshield, wherein a second part (36, 46) of the device (32, 44, 58) is permanently connected with the wiper blade, wherein the first part is connected to the second part (36, 46) by means of a link (38, 50, 60), wherein the link flexes approximately perpendicular to a vehicle windshield (30), wherein the link is a leaf spring, and wherein the guide surfaces (42) have ribs (56) extending in a stroke direction (40).

2. The combination according to claim 1, wherein the device (32, 44, 58) is formed onto a part (36) of the bracket (18, 20) or a cap (46) of the wiper strip (26).

3. The combination according to claim 1, wherein the leaf spring (38, 50, 60) is disposed at an end of the guide surfaces (42) oriented toward the vehicle windshield (30).

4. The combination according to claim 1, wherein the wiper arm has projections (52) extending in the stroke direction (40) in a vicinity of the guide surfaces (42).

5. The combination according to claim 1, wherein the link (38, 50, 60) is disposed on a top, on a side, or in an extension of the wiper blade (16).

* * * * *